J. F. QUIMBY.

Reservoir Cooking-Stoves.

No. 5,124. Reissued Oct. 29, 1872.

*Witnesses.*

E. D. Babcock.

Samuel Andrews.

*Inventor*

Julius F. Quimby.

AM. PHOTO-LITHOGRAPHIC CO. N.Y. (OSBORNE'S PROCESS.)

UNITED STATES PATENT OFFICE.

GEORGE W. SWETT, JULIUS F. QUIMBY, AND SAMUEL W. PERRY, ASSIGNEES OF JULIUS F. QUIMBY, OF TROY, NEW YORK.

IMPROVEMENT IN RESERVOIR COOKING-STOVES.

Specification forming part of Letters Patent No. 83,407, dated October 27, 1868; reissue No. 5,124, dated October 29, 1872.

*To all whom it may concern:*

Be it known that I, JULIUS F. QUIMBY, of the city of Troy, county of Rensselaer and State of New York, have invented certain new and useful Improvements in Water-Reservoir Cooking Stoves or Ranges; and I do hereby declare that the following is a full and exact description of the same, reference being had to the annexed drawing and the letters of reference marked thereon forming a part of this specification, in which—

Figure 1:
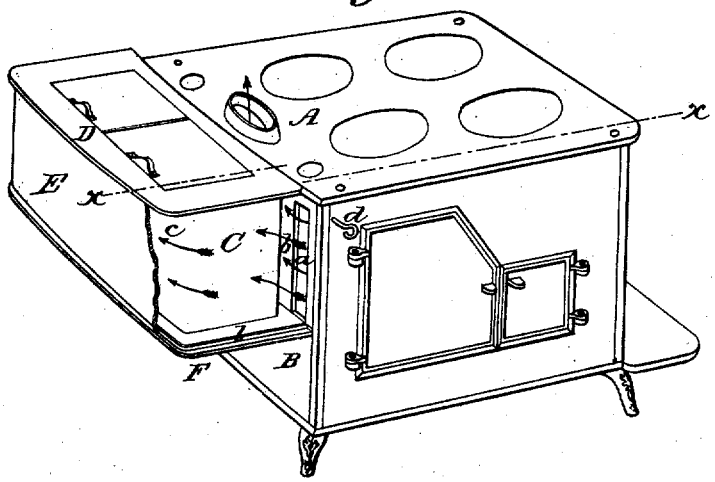
Figure 2:
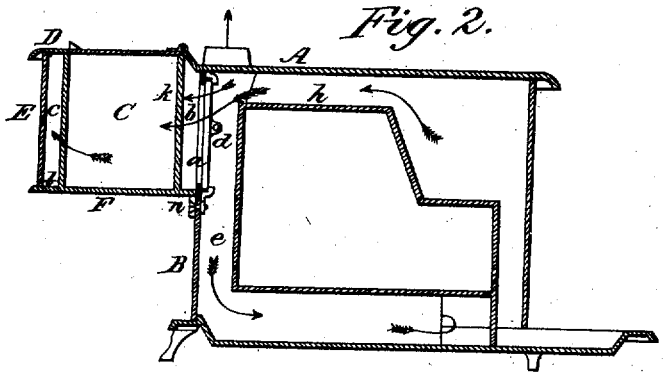
Figure 3:
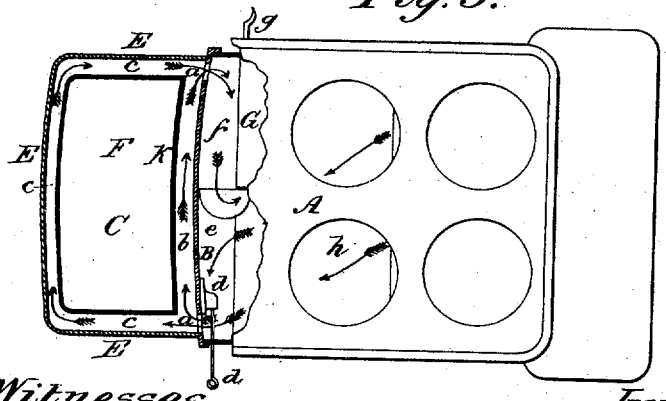

Figure 1 is a perspective view of a cooking-stove, and showing my improved water-reservoir or tank attached thereto and connected therewith by my improved manner of construction thereof; Fig. 2 is a vertical longitudinal sectional view taken at the dotted line *x x* of Fig. 1; and Fig. 3 is a top or plan view of my improved water-reservoir cooking-stove with the reservoir-top plate and a part of the stove-top plate removed to show more clearly my said improvements therein.

The same letters refer to like parts in each of the said figures.

My said invention relates to improvements in that class of cooking-stoves provided with a water-reservoir at the back, by means of which improvements water can be heated in a reservoir so located with less fuel, and when heated can be kept so for a longer space of time, than by any other stove before known.

To enable others skilled in the art to make and use my said invention, I now proceed to fully describe its construction and operation, to wit:

In the annexed drawing, A represents a cooking-stove of the usual form and construction, and with the addition thereto, as made in and through its exterior rear or end side plate B, and at each side thereof, of the induction and exit apertures *a* and *a'*, respectively, in manner substantially as shown in Figs. 1 and 3. The hot-water reservoir C is constructed with a continuous flange or rim, D, projecting outward from its top edges, at its front, back, and end sides. The bottom F of this reservoir likewise projects outward at and from its front and back and end sides, respectively and continuously. It has also a ridge or small flange, *l*, upon and near the edge of said projecting flange or rim, that extends around the ends and rear thereof, to aid in holding a casing or jacket to said reservoir bottom edges. The respective end sides and rear sides of said reservoir C are now inclosed by a jacket or casing, E, either of cast or sheet, tinned or zinced iron, which is secured to the respective top and bottom projecting flanges or rims D and F of said reservoir by rivets or bolts, or by other suitable means, and in such a manner as to form double end sides and rear side for said water-reservoir C, and inclosing a space or chamber between said walls or sides, which, being full of air, retards and prevents the cooling of water in said reservoir by retarding and preventing the radiation of heat therefrom by the non-conducting properties of air in said chamber between said double end sides and rear side of said water reservoir or tank; and the said chamber or space forms also a flue, *c*, which, being connected with the diving or descending flue of the cooking-stove A, in manner as hereinafter described and shown, forms a branch flue therefrom, which diverts a portion of heat therefrom that passes in horizontal direction around and between the aforesaid double end sides and rear side of said water reservoir or tank, substantially in manner as shown in Figs. 1 and 3 of the annexed drawing, to thereby more rapidly heat water in said water reservoir or tank C. This water reservoir or tank, as thus constructed substantially, is now arranged at and attached by lugs and bolts, or by other suitable means, to the exterior wall or side B of a cooking stove or range, A, and in manner such that the projecting top and bottom edges of the flanges or rims aforesaid, or the equivalent devices therefor, and the end side edges of the jacket or side casing E of said water-reservoir, may make a close joint with the exterior wall or rear side B of a cooking-stove, so as to thereby form a transverse flue, *b*, between the water-reservoir C and the exterior wall B of the stove, which separates the flue *b* from the stove-flues *e* and *f*, or their equivalent flues, which are, by means of the induction and exit openings *a* and *a'* aforesaid, connected with the said reservoir-flue *c*; and the transverse flue *b* connects at each end with the ends of flue *c* near the apertures *a* and *a'*, in manner substantially as shown in Fig. 3 in the annexed drawing. The induction-opening *a* is provided with a damper, *d*, with which to close it whenever desired, so as to send or divert all of the hot products of combustion under and through the oven-flues. A damper, G, is arranged in the usual manner within the top flue of the stove to shut off the direct draught to the exit-pipe, when so desired, to thereby send heat through the oven-flues and also through the reservoir-flues *c* and *b*. The reservoir top is provided with the usual lids or covers.

To operate this improved water-reservoir cooking-stove, close the direct-draft damper G and open the water-reservoir flue-damper *d*. The heated gases and products of combustion now pass to the descending flue *e*, thence through the induction-opening *a* into the reservoir-flues *c* and *b*, circulating therein around and about the sides and ends of said water-reservoir C in the manner about as shown by the red arrows in the annexed drawing, and so as to heat quickly and effectively and keep hot water within said reservoir. The heated gases pass thence through the exit-opening *a'* into the rising exit-flue *f*, thence into the exit-pipe, as shown. The amount of heat passing into said reservoir-flues is easily regulated by said damper *d* by partially closing the opening *a* therewith, so as to graduate the temperature of water in said reservoir from warm to hot and hot to warm, as may be wanted, and when no hot water is wanted entirely close said damper *d*, which thereby diverts all of the heated gases through the oven-flues.

This improved water-reservoir may be adapted to and applied to "three flued" and other varieties of flues in cooking-stoves by shifting, if necessary, the location of the exit-opening *a'*, so as to always connect it with the rising exit-flues of a stove, and by shifting, if necessary, the induction-opening *a*, so as to always connect with the descending or diving flues thereof, thus shifting their positions respectively, whenever necessary, to suit the particular arrangement of stove-flues in each case to which the improved water-reservoir may be applied.

Having thus fully described my invention, what I claim, and desire to secure by Letters Patent, is—

1. A cooking-stove and water-reservoir, both constructed substantially as described, in combination with the inclosed chamber C at the back and end sides of the reservoir.

2. The cooking-stove, the water-reservoir at the back of the stove, and the chambers inclosing the back and end sides of the water-reservoir and opening into the flue-space of the stove, so that the said chambers can receive heat from the products of combustion before they pass around the oven, substantially as described.

3. The cooking-stove, the water-reservoir, the flue extending around the end sides and the back of the water-reservoir, and communicating with the vertical flues back of the oven, and the dampers for controlling the passage of the products of combustion around the water-reservoir, substantially as described.

JULIUS F. QUIMBY.

Witnesses:
E. D. BABCOCK,
SAMUEL ANDRUS.